Figure 1:
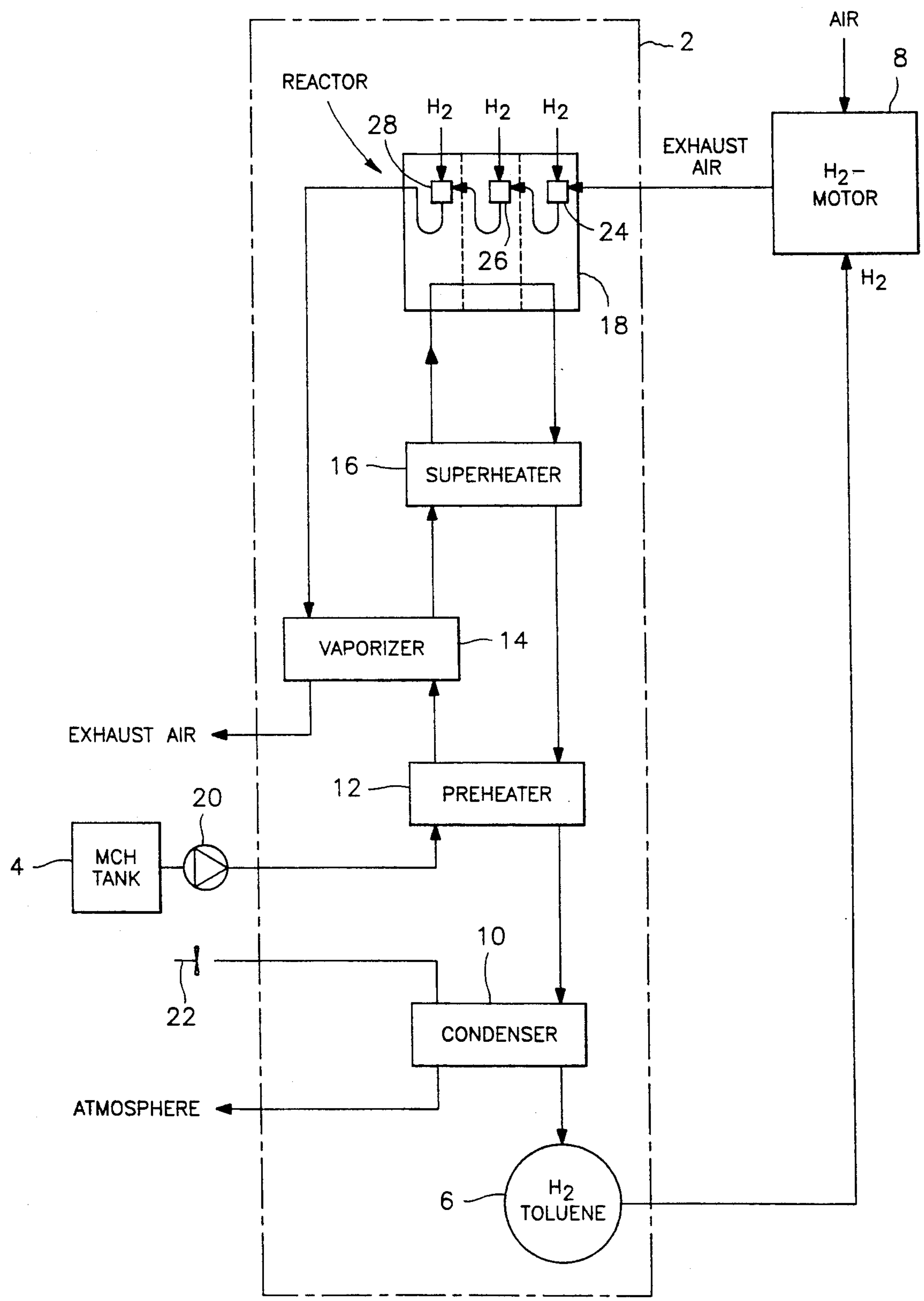

US005180560A

United States Patent [19]

Nasser

[11] Patent Number: 5,180,560

[45] Date of Patent: Jan. 19, 1993

[54] APPARATUS FOR DEHYDROGENATION OF LIQUID HYDRIDES

[75] Inventor: Gamal E. D. Nasser, Puccheim, Fed. Rep. of Germany

[73] Assignee: Mohamed Nasser, Germering, Fed. Rep. of Germany

[21] Appl. No.: 887,376

[22] PCT Filed: Sep. 3, 1988

[86] PCT No.: PCT/EP88/00803

§ 371 Date: May 3, 1989

§ 102(e) Date: May 3, 1989

[87] PCT Pub. No.: WO89/01823

PCT Pub. Date: Mar. 9, 1989

Related U.S. Application Data

[63] Continuation of Ser. No. 350,750, May 3, 1989, abandoned.

[30] Foreign Application Priority Data

Sep. 3, 1987 [DE] Fed. Rep. of Germany ....... 3729526

[51] Int. Cl.[5] .......................... F28D 7/00; B01J 8/04; F28F 3/00

[52] U.S. Cl. .................................. 422/189; 422/198; 422/235; 165/166

[58] Field of Search ...................... 422/189, 198, 235; 165/166

[56] References Cited

U.S. PATENT DOCUMENTS 3,759,322 9/1973 Nasser et al. ...................... 165/166

FOREIGN PATENT DOCUMENTS 1146725 5/1983 Canada .
3618225 12/1987 Fed. Rep. of Germany .
2057908 4/1981 United Kingdom .

*Primary Examiner*—Douglas W. Robinson
*Assistant Examiner*—Timothy J. Reardon
*Attorney, Agent, or Firm*—Jacobson, Price, Holman & Stern

[57] ABSTRACT

An apparatus for the dehydrogenation of liquid hydrides consisting of a chemical reactor (18) to dehydrogenate the heated vaporous hydrides, a pre-heating stage (12*a*, 12*b*) to pre-heat the hydride, a vaporization stage (14*a*, 14*b*), to vaporize the hydride, a superheating stage (16*a*, 16*b*) to superheat the vaporous hydrides and a condensation stage (10*a*, 10*b*) to cool the dehydrogenation products. All stages, including the reactor, are designed as plate-shaped hybrid heat exchangers stacked side by side. Two cylindrical storage containers (6*a*, 6*b*) for the dehydrogenation products are located at both front ends of the heat exchanger stack. Side plates (30, 32) linked to the storage containers (6*a*, 6*b*) function as tie rods, providing the apparatus, in conjunction with the storage containers with the required stability. The spaces (36, 38) between the side plates and the heat exchanger stack hold guide channels for the flow media. In particular, the apparatus is distinguished by its inexpensive design, compactness and low weight.

8 Claims, 4 Drawing Sheets

EXHAUST AIR
EXHAUST AIR
EXHAUST AIR
MCH
MCH
MCH
MCH
H2' TOLUENE
H2' TOLUENE
AIR
AIR
H2
TOLUENE
18.3
18.2
18.1
16.6
16.5
16.4
16.3
16.2
16.1
12.6
12.5
12.4
12.3
12.2
12.1
6
10
12
14
16
18
24
26
28
36
38
46
48
50
52
54

APPARATUS FOR DEHYDROGENATION OF LIQUID HYDRIDES

This is a continuation of application Ser. No. 07/350,750, filed May 3, 1989 and now abandoned.

The invention involves an apparatus for the dehydrogenation of liquid hydrides with a chemical reactor, designed as a heat exchanger, for the dehydrogenation of heated vaporous hydride, a heat exchanger fluid to heat the hydride, at least one combustion chamber to heat the heat exchanger fluid by burning hydrogen, at least one heat exchanger to heat the hydride fed to the reactor using the heat exchanger fluid or the dehydrogenation products leaving the reactor, at least one heat exchanger to cool down the dehydrogenation products leaving the reactor and at least one storage container for the cooled dehydrogenation products leaving the reactor.

In particular, the invention refers to an apparatus for the dehydrogenation of liquid hydrides suitable to drive hydrogen-powered vehicles.

A fundamental problem in the development of practical vehicles driven by means of hydrogen-powered combustion engines is how to store the hydrogen suitably in the vehicles. In this regard, it has proven useful from various points of view to make use of the organic-chemical storage of hydrogen in liquid hydrides. Methyl cyclohexane, which is a liquid that can be stored in simple tanks under normal pressure and at a normal temperature, is especially suited as a liquid hydride. The hydrogen is stored by dehydrogenation of toluene to methyl cyclohexane.

Methyl cyclohexane is pumped into the vehicle as a liquid hydride carrier. The vehicle contains a dehydrogenation system in which the methyl cyclohexane (MCH) is split into toluene and hydrogen in a chemical reactor using the application of heat and a suitable catalyst. The hydrogen recovered in this way is stored temporarily and used mainly to drive the hydrogen-powered combustion engine, but in part also to generate the heat in the reactor required for dehydrogenation. The liquid toluene produced during dehydrogenation is also stored and returned to the pump the next time the vehicle is filled up. The toluene can then be dehydrogenated once again to MCH in suitable dehydrogenation plants, closing the cycle.

Appropriate test set-ups were developed which showed that the aforesaid process can definitely be realized in practice. However, in the case of these test set-ups the dehydrogenation system including the necessary auxiliary equipment and measuring equipment, was of such a volume that it took up the space of the loading area of a truck or of a trailer. This is one of the basic reasons why this technology is not yet realizable in practice at present.

The objective of the invention, therefore, is to create an apparatus for the dehydrogenation of liquid hydrides of the type mentioned at the beginning. These hydrides are especially distinguished by the fact that they are compact, lightweight and inexpensive to produce.

As claimed, this objective is essentially solved by the fact that the chemical reactor and the heat exchangers are all plate-shaped, that the plate-shaped heat exchangers are stacked side by side, that a storage container is placed on each front end of the heat exchanger stack and the two storage containers enclose the heat exchanger stack between them, that plates acting as tie rods are place on both sides of the stack (these plates being attached to opposite end sections of the storage containers and at a distance from the heat exchanger stack) and that at least one combustion chamber as well as baffle and connecting channels, via which the various heat exchangers are linked together, are placed in the space between the side plates and the opposite sides of the heat exchanger stack.

The plate-shape region of the heat exchangers and their stack-shaped arrangement creates an extremely space-saving configuration. As the reaction medium is under a pressure of 10 to 20 bar, the apparatus must be very stable. This high stability is attained through the especially simple structural method of placing the heat exchanger packet between the storage containers located at the ends, which can be made of sufficiently strong material, and through the side plates, which function as tie rods and which are linked to the storage containers, absorbing the forces acting on the storage containers in a simple way. Therefore, it is possible to make the plate-shaped heat exchangers, in which an operating pressure of approximately 20 bar prevails, of thin material while reducing costs and material expenditures, since the pressure forces are absorbed by the clamp-shaped storage container/side plate arrangement surrounding the heat exchanger packet.

A particularly space and material-saving arrangement also results from the fact that the combustion chamber used to heat the heat exchanger fluid by burning hydrogen as well as the baffle or rather connecting channels linking the various heat exchangers together are placed in the space between the side plates and the opposite sides to them of the heat exchanger stack. In addition, this also results in the various fluids having to travel especially short distances, which also contributes to the apparatus being highly efficient.

In the ideal design of the invention, the storage containers are partially cylindrical, the cylinder axis running parallel to the plate-shaped heat exchangers, the diameter of the partial cylinder being greater than the width of the heat exchanger stack and the partial cylinder extending more than 180° in the radial direction. Accordingly, the partially cylindrical storage containers extend beyond the heat exchanger stack on both sides, the side plates of the apparatus being located almost tangentially to the partially cylindrical walls of the storage containers and welded to them at this point. The partially cylindrical shape of the storage containers gives them high mechanical stability with, at the same time, comparatively thin wall strengths. In an appropriate subsequent development of the invention, it is planned to arrange the heat exchangers in a such away that the chemical rector is located in the middle of the heat exchanger stack and that the less hot heat exchangers are connected to it in an outward direction. If several heat exchangers are used, the mean temperature, in particular, of the individual heat exchangers may decrease from the interior towards the exterior. This keeps heat losses low and also reduces insulation problems.

In accordance with an especially ideal feature of the invention, the apparatus is designed symmetrically in such a way that identical heat exchanger stages are attached to both sides of the rector located in the middle. Consequently, all of the other heat exchanger stages, with the exception of the reactor, are provided twice in an identical fashion and the process runs twice in both directions in an identical fashion between the central reactor and the two storage containers on the sides. More specifically, a heat exchanger serving as a superheating stage can be placed on each side of the reactor, then on both sides of these heat exchangers serving as a vaporization stage, then on both sides of these heat exchangers serving as a pre-heating stage and on both sides of these heat exchangers serving as a cooling stage or condenser. The fluids circulate in such away that the hydride passes through the pre-heating stages, the vaporization stages, the superheating stages and the reactor one after the other, in such away that, after the dehydrogenation of the hydride, the dehydrogenation products ($H_2$ and toluene and nonreactive MCH) pass through the superheating stages, the pre-heating stages and the cooling stages and in such away that the heat exchanger fluid used to heat the hydride in the rector and in the vaporization stages—where it is used with $H_2$ combustion engines, the engine exhaust air—passes through the vaporization stages after passing through the reactor.

In accordance with an especially ideal feature of the invention, an extremely compact, very highly efficient apparatus results if the plate-shaped heat exchangers are designed as a hybrid heat exchanger of a type which is basically known, consisting in each case of a number of stamped profiled sheets which are welded together and which define between them alternately a large number of parallel tube-shaped flow medium channels and a number of slot-shaped, wave-like channels vertical to the former. Such hybrid heat exchangers combine the resistance to heat and pressure of a tube exchanger with the compact and material-saving design of a plate exchanger, heating surfaces densities of up to 250 $m^2$ exchange surface per cubic meter of structural volume being realizable. The wave-shaped course of the transverse flow channels produces great turbulences and, thus, excellent heat transmission conditions. For example, suitable hybrid heat exchangers are offered by IPG Bavaria, Industrieplanungsgesellschaft mbH fur thermische Verfahrenstechnik /Industrial Planning Private Limited Company for Thermal Process Engineering/, Munich, under the name IPEX-Hybrid.

Figure 2:
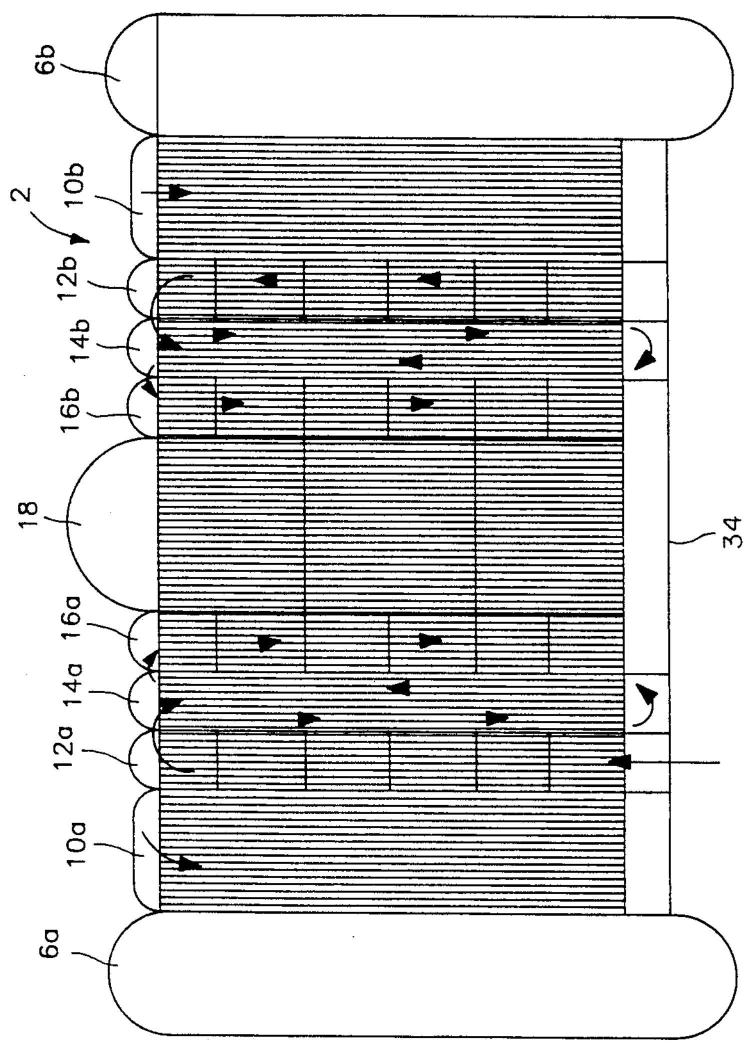

Further advantageous features of the invention result from the other sub-claims and from the description below in which an ideal example of the invention is described in more detail using the drawing. The drawing contains:

FIG. 1 a diagrammatic representation of the dehydrogenation process of the claimed apparatus, FIG. 2 a side view of the claimed apparatus in a half-diagrammatic representation.

Figure 3:
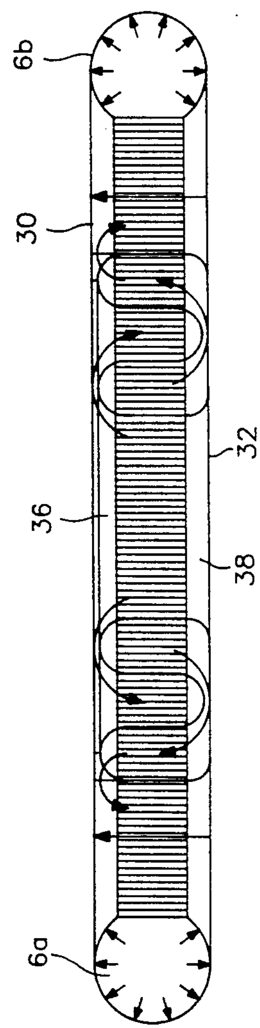

FIG. 3 a top view of the claimed apparatus in a half-diagrammatic representation.

Figure 4:
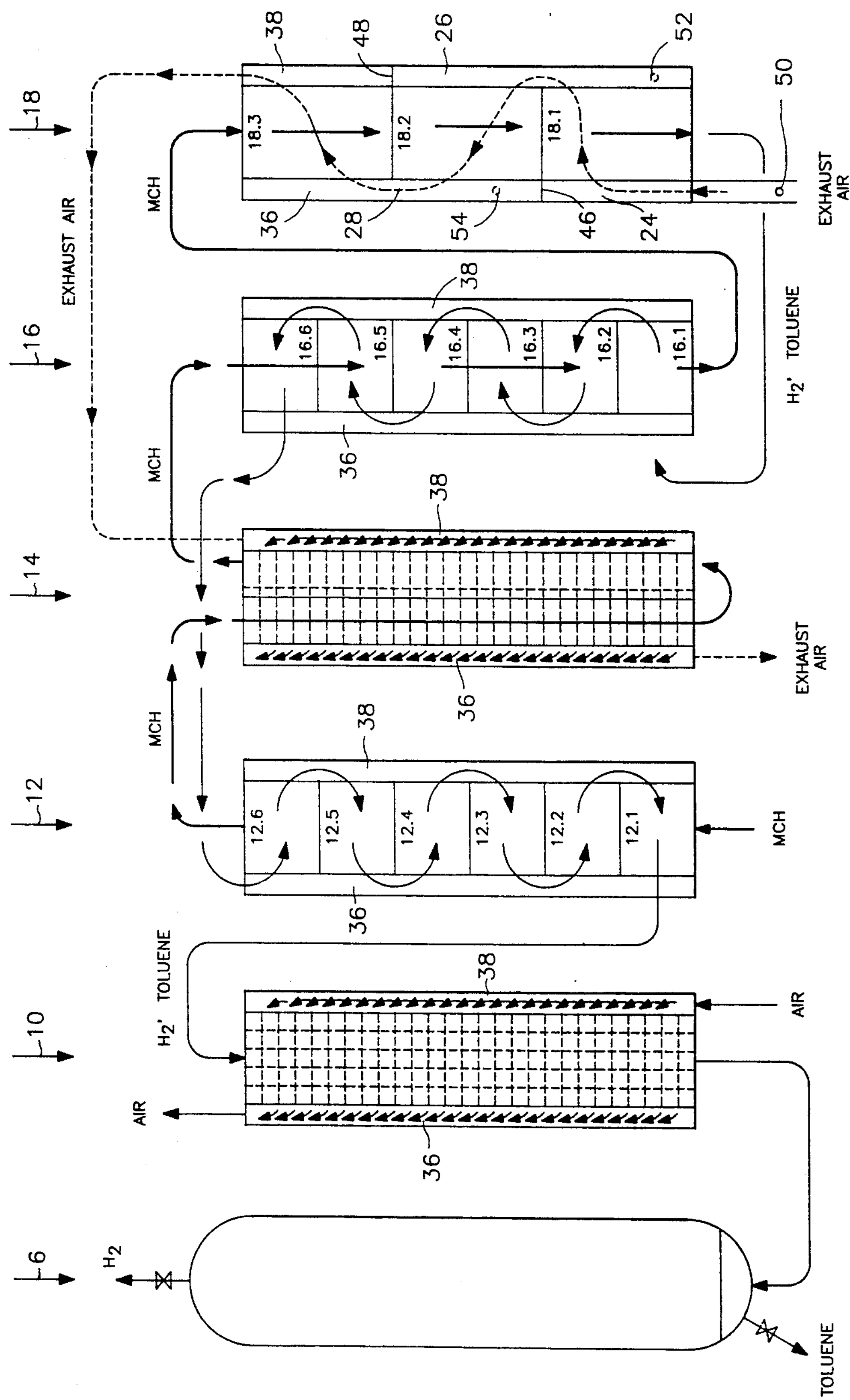
Figure 5:
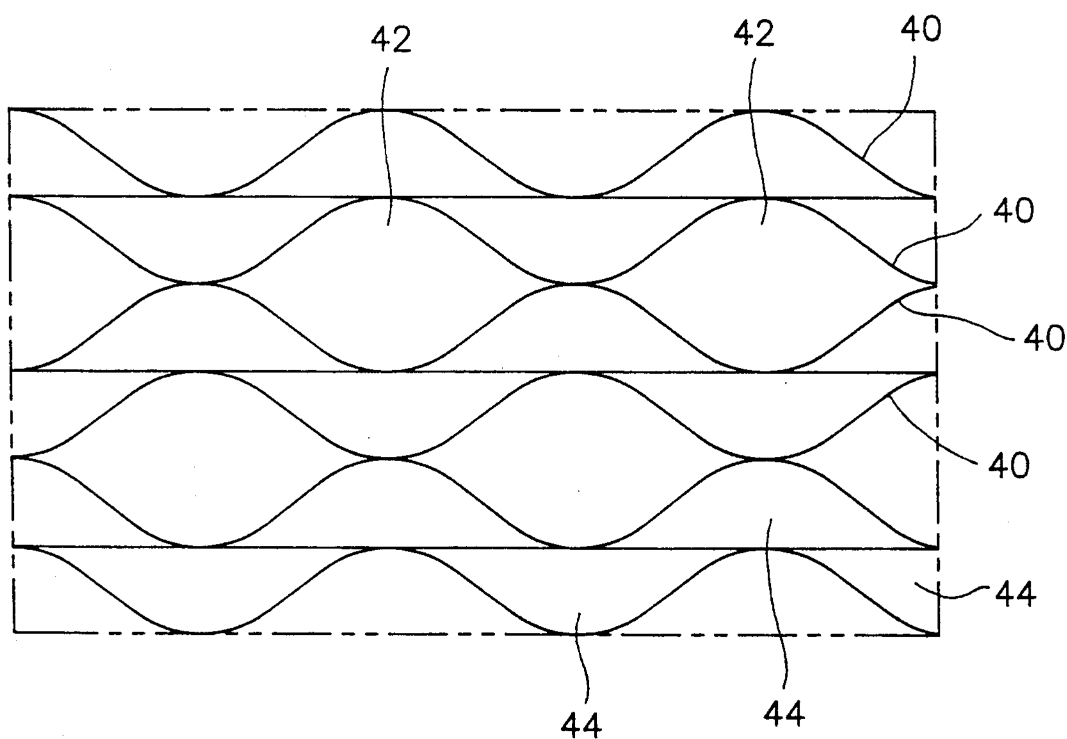

FIG. 4 a sectional view of the individual heat exchanger stages of the apparatus in accordance with FIG. 2 viewed in the direction of arrow IV, the individual heat exchanger stages being shown side by side in a lateral view with only half of the apparatus being illustrated, and FIG. 5 a section through a hybrid heat exchanger of the claimed apparatus.

Reference is first made to the basic diagram in FIG. 1. It should be noted that, in contrast to the illustrations in FIGS. 2 and 3, a single heat exchanger stage is illustrated in the basic diagram in FIG. 1, whereas in the case of the example shown in FIGS. 2 to 4 two identical heat exchanger stages are provided. However in the interests of clarity the second set of heat exchanger stages was not illustrated in FIG. 1.

In FIG. 1, reference number 2 designates a dehydrogenation apparatus used to dehydrogenate the liquid hydride, specifically methyl cyclohexane (MCH), stored in a vehicle tank 4. MCH, which represents an organic carrier of hydrogen, is fed from the tank 4 of the dehydrogenation apparatus 2 under a pressure of approximately 20 bar into the dehydrogenation apparatus 2 where it is split catalytically and with the application of heat into hydrogen and toluene. The hydrogen recovered through this process is stored temporarily in a storage container 6 and used to power the hydrogen engine 8 driving the vehicle, for example a truck. The hot exhaust air of the hydrogen engine 8 is fed to the dehydrogenation apparatus 2 in order to heat the reactor. Since the heat transferred from the engine exhaust gases to the dehydrogenation apparatus 2 is not sufficient to meet the heart requirements of the dehydrogenation unit, the heat deficit in the dehydrogenation apparatus is covered by burning part of the hydrogen produced.

The cycles illustrated in FIG. 1 are discussed in more detail below.

The dehydrogenation apparatus 2 is made up of a condensation stage 10, a pre-heating stage 12, a vaporization stage 14, a superheating stage 16 and a chemical reactor 18. The MCH in the tank 4 is fed to the dehydrogenation apparatus 2 via the pump 20 under a pressure of approximately 20 bar, where it first passes through the pre-heating stage 12 designed as heat exchangers in which it is pre-heated to a temperature of approximately 235° C. Then the pre-heated MCH passes through the vaporization stage 14, which is also designated as heat exchangers, in which the MCH, which has been liquid up to this point, is heated further and vaporized. The MCH vapor is then passed through the superheating stage 16 designed as heat exchangers in which the vapor is superheated to approximately 390° C., just under the reaction temperature. The superheated vapor then enters the reactor 18 in which it is dehydrogenated catalytically with the application of further heat, hydrogen and vaporous toluene being produced as the main dehydrogenation products.

The hydrogen-toluene mixture exhausted from the reactor 18 now has a temperature of approximately 420° C. and is once again fed into the superheating stage 16 where it transfers part of its heat to the MCH to be superheated. After leaving the superheating stage 16, the hydrogen-toluene mixture has a temperature of approximately 250° C. and is then fed to the pre-heating stage 12 in which it pre-heats the liquid MCH coming from the tank 4. Finally, the hydrogen-toluene mixture which has been cooled down passes through the condensation stage 10 in which the toluene is further cooled and condensed. Air is provided as the cooling medium for the condensation stage 10 in the example described here. This air is fed to the heat exchanger 10 via a fan 22. Obviously, cooling water, for example, could also be used as an alternative cooling medium.

The dehydrogenation products cooled to approximately 30° C., specifically hydrogen and toluene in the main, are finally stored or stored temporarily in storage container 6, the toluene being in liquid form, the hydrogen in vaporous form. In addition, if desired, the toluene can be separated from the hydrogen in a manner not described in more detail.

In order to heat the reactor 18, hot exhaust air from the hydrogen engine is fed top it. Because, as already mentioned, the temperature of the exhaust air from the hydrogen engine is not sufficient to meet the heat requirement of the reactor 18, additional hydrogen is burned in suitable combustion chamber 24, 26 and 28 of the reactor 18 in order to raise the temperature of the exhaust air from the hydrogen engine to approximately 650° C. In order to assure a uniform distribution of the heat over the entire reactor, the latter is designed in three stages in total. Each stage has a combustion chamber 24, 26 or 28 respectively in which the exhaust air which has been cooled down to approximately 420° C. is heated again to 650° C.

After passing through the reactor 18, the exhaust air from the hydrogen engine flows through the vaporizer 14 in which it is cooled down to approximately 330° C. while transferring heat to the MCH. Then the exhaust air is exitted into the atmosphere.

Reference is made below to FIGS. 2 to 5.

As can be sen from FIGS. 2 and 3, the dehydrogenation apparatus 2 consists of one unified block. It is made upon of the centrally located reactor 18 and, attached to each side of it, a superheating stage 16*a*, 16*b*, a vaporization stage 14*a*, 14*b*, a preheating stage 12*a*, 12*b*, a condensation stage 10*a*, 10*b* and a storage container 6*a*, 6*b*. Each of the stages 10*a*. 10*b*, 12*a*, 12*b*, 14*a*, 14*b*, 16*a* and 16*b* as well as the reactor 18 are designed as plate-shaped heat exchangers and have in the direction of arrow IV in FIG. 2 essentially the same dimensions. The individual plate-shaped heat exchangers are stacked side by side so that they form a unified block, as can be seen clearly from FIGS. 2 and 3. A storage container 6*a*, 6*b* is placed at both ends of the heat exchanger block. Each storage container is partially cylindrical and its axis extends parallel to the longitudinal side of the individual heat exchanger plates. The diameter of the partially cylindrical storage containers 6*a*, 6*b* is, as can be clearly seen in FIG. 3, greater than the depth of the heat exchanger packet so that the storage containers 6*a*, 6*b* project laterally beyond the heat exchanger packet. Side plates 30, 32 are provided which run parallel to the lateral surfaces of the heat exchanger packet and which are welded firmly to the storage containers on both edges facing the storage containers 6*a*, 6*b* in such a way that the side plates 30, 32 run almost tangentially to the partially cylindrical storage containers 6*a*, 6*b*. As can be seen in FIG. 2, the head pieces allocated to the individual heat exchangers close the heat exchangers at the top. A lower closing plate 34 is weeded to the storage containers 6*a*, 6*b* by its front end and to the side plates 30, 32 along its longitudinal side, closing the heat exchanger packet at the bottom.

As is explained below in more detail, the individual heat exchangers 10*a* to 16*b* and the reactor 18 consist of individual, comparatively thin plates which are not capable of containing the high operating pressure prevailing in the heat exchanger packet without additional reinforcement. In the case of the claimed arrangement, the pressure is absorbed by the two storage containers 6*a*, 6*b* at the ends. These storage containers are made of sufficiently strong material and, in any case, exhibit a high inherent stability based on their cylindrical configuration. The side plates 30, 32 lining the two storage containers 6*a*, 6*b* serve as tie rods between the two storage containers 6*a*, 6*b*, so that the heat exchanger packet is bracketed by the two side plates and, as a result, the pressure occurring are absorbed by the dehydrogenation apparatus in the simplest way.

The guide and baffle channels for the fluids flowing through the individual heat exchangers and the combustions chambers 24 to 28 are located in the spaces 36 and 38 between the side plates 30, 32 and the opposite side walls of the heat exchanger packet.

The individual heat exchangers 10*a* to 16*b* each consist of hybrid heat exchangers as illustrated in cross-section in FIG. 5. Each heat exchanger consists of several plate elements 40 welded together which exhibit stampings of such a kind that a weeded plate packet has tube-like flow medium channels in the one direction—in the case of the sectional view in FIG. 5, vertical to the drawing plane—and slot-shaped flow medium channels extending wave-like from one side to the other of the plate packet in a transverse direction—in the case of the illustration in FIG. 5, horizontally. The tube-like flow medium channels 42 are called tubes below, the slot-shaped, wave-like flow medium channels slots.

Reference will be made below to the illustration in FIG. 4. Only half of the arrangement illustrated in FIGS. 2 and 3 is illustrated in FIG. 4. However the other half is completely identical so that explanation of the one half is sufficient to understand the invention.

The MCH fed from the tank 4 (compare FIG. 1) to the dehydrogenation apparatus 2 enters the pre-heating stage 12 from below and passes through the vertical running slots of the heat exchanger. The heat exchanger of the pre-heating stage 12 consists of six compartments 12.1, 12.2, 12.3, 12.4, 12.5 and 12.6 stacked on top of one another whose slots are linked together. The tubes are arranged horizontally and the dehydrogenation products coming from the superheating steps 16 flow through each compartment one after the other, starting with the upper compartment 12.6 and ending the lower compartment 12.1. As illustrated by the arrows, the dehydrogenation products mainly flow serpentine-like in the pre-heating stage 12 from the top to the bottom, so that the two components flow through the pre-heating stage 12 on a counter-current basis. Suitable guide plates are placed* in the lateral spaces 36, 38 in order to bring about the serpentine-like flow through the individual compartments 12.1 to 12.6.

* and stampings are provided on the appropriate places on the plate elements.

The pre-heated MCH leaves the pre-heating stage 12 at its upper side and is then fed to the upper side of the vaporization stage 14. The slots of the heat exchanger also run vertically and the tubes transversely to them, horizontally, in this vaporization stage. The MCH first flows through the vaporization stage 14 from the top to the bottom and then on the opposite side of the heat exchanger from the bottom to the top. The stampings in the middle of the plate elements ensure that the left section of the heat exchanger is separated from the right in FIG. 4.

The heated exhaust air coming from the reactor 18 flows from above via the space 38 into the vaporization stage 14 and reaches, after flowing through the tubes of the heat exchanger, the space 36, from which it exits into the atmosphere.

The now vaporous MCH leaving the vaporization stage 14 is fed to the superheating stage 16 from above and leaves it from the lower end. The deign of the superheating stage 16 corresponds to that of the pre-heating stage 12; in particular, the superheating stage 16 is also composed of six compartments 16.1 to 16.6 which are stacked on top of one another and which the dehydrogenation products leaving the reactor 18 flow through from the top to the bottom, meander-like. The two components flow through the superheating stage 16 on a counter-current base as well.

The various MCH exitting at the bottom of the superheating stage 16 is then fed from the top to the reactor 18 in which the slots of the heat exchanger once again run vertically, so that the MCH passes through the reactor wave-like from the top to the bottom. The reactor 18 is constructed of three stages 18.1, 18.2 and 18.3 stacked on top of one another, the exhaust air form the hydrogen engine passing through each stage 18.1 to 18.3 one after the other. By means of baffle plates in the spaces 36, 38, the exhaust air is directed through successive stages in alternately opposing direction. The baffle plates 46, 48 in the spaces 36, 38 define chambers 24, 26, 28 into which hydrogen feed pipes 50, 52, 54 open, in each case into the lower section. Additional hydrogen is burned in these combustion chambers 24, 26 and 28 in order, as described above, to heat the exhaust air from the hydrogen engine to the required reaction temperature.

As is clear from FIG. 4, on the whole the reactor 18 is also operated on counter-current basis.

The dehydrogenation products leaving the lower end of the pre-heating stage 12, specifically hydrogen and toluene in the main, are fed to the upper side of the condensation stage 10 whose heat exchanger has vertical continuous slots and horizontal tubes. In order to cool down the hydrogen-toluene mixture, fresh air is fed to the tubes of the heat exchanger 10 from below via space 38 by means of a fan. This fresh air passes through the heat exchanger from right to left, is collected in space 36 and exitted upwards into the atmosphere.

Finally, the cooled hydrogen-toluene mixture is exitted to the bottom of the condensation stage 10 and then fed to the storage container, in which the hydrogen is stored temporarily for further use.

| REFERENCE NUMBER LIST | |
|---|---|
| 2 | Dehydrogenation apparatus |
| 4 | Tank |
| 6 | Storage container |
| 8 | Hydrogen engine |
| 10 | Condensation stage |
| 12 | Pre-heating stage |
| 14 | Vaporization stage |
| 16 | Superheating stage |
| 18 | Reactor |
| 20 | Pump |
| 22 | Fan |
| 24 | Combustion chamber |
| 26 | Combustion chamber |
| 28 | Combustion chamber |
| 30 | Side plate |
| 32 | Side plate |
| 34 | Closing plate |
| 36 | Space |
| 38 | Space |
| 40 | Plate element |
| 42 | Tubes |
| 44 | Slots |
| 46 | Baffle plate |
| 48 | Baffle plate |

I claim:

1. An apparatus for the dehydrogenation of liquid hydrides, comprising a chemical reactor for the dehydrogenation of heated vaporous hydride wherein hydride fed to the reactor is heated by cooling dehydrogenation products leaving the reactor and further heated in the reactor by the heat of combustion hydrogen in a hot hydrogen-containing gas stream fed to the reactor and the cooled dehydrogenation products are then stored in storage containers, and said chemical reactor comprises a plurality of combustion chambers connected in series in which hydrogen is combusted and a reactor heat exchanger for transferring heat from combusting hydrogen to dehydrogenating hydride, said reactor heat exchanger comprising a plurality of stages through which the hydride passes during hydrogenation;

said chemical rector is connected in series with a superheating heat exchanger, a vaporizing heat exchanger and a preheating heat exchanger wherein said hydride to be dehydrogenated passes through the preheating heat exchanger, vaporizing heat exchanger and superheating heat exchanger, in series, for heating, and said hydrogen liberated from said hydride in said chemical reactor passes in the reverse direction from said chemical reactor through the superheater heat exchanger and the preheating heat exchanger, for cooling;

said reactor heat exchanger, superheating heat exchanger, vaporizing heat exchanger and preheating heat exchanger each comprise plate-type heat exchangers;

said plate-type heat exchangers are stacked adjacent to each other in series;

said storage containers for storing the dehydrogenation products are positioned at each end of the heat exchanger stack having the heat exchanger stack therebetween;

a pair of substantially parallel plates acting as tie rods connect the storage containers, one on each side of the heat exchanger stack; and a channel connecting said heat exchangers is placed in a space defined by each of said pair of plates and sides of the heat exchanger stack opposite said plates.

2. The apparatus in accordance with claim 1 wherein said storage containers comprise a substantially cylindrical portion having a cylindrical axis running parallel to the length of said plate-type heat exchangers and a diameter greater than the width of the heat exchanger stack and the cylindrical portion extends over more than 180°.

3. The apparatus in accordance with claim 1 wherein said chemical rector is positioned in series with a superheating heat exchanger, a vaporizing heat exchanger and a preheating heat exchanger on each side thereof.

4. The apparatus in accordance with claim 3 wherein said heat exchangers are attached to each side of the centrally positioned chemical reactor to form a symmetrical array of heat exchangers, and the temperature of the individual heat exchangers decreases from the center of the heat exchanger stack to the ends thereof.

5. The apparatus in accordance with claim 4 wherein condensers serving as a cooling stage for the dehydrogenation products exiting the preheating heat exchangers are attached to each of the preheating heat exchangers.

6. The apparatus in accordance with claim 1 wherein at least the reactor heat exchangers, the superheating heat exchangers and the preheating heat exchangers are connected so that the inflowing fluid and the outflowing fluid flow counter-currently within said heat exchangers.

7. The apparatus in accordance with claim 1 wherein the plate-type heat-exchangers are hybrid heat exchangers each comprising a plurality of wave-like shaped plates welded together and which define between them alternately a plurality of parallel, tube-shaped channels and a plurality of slot-shaped wave-like channels perpendicular to said tube-shaped channels.

8. The apparatus in accordance with claim 1 adapted for operation at a pressure of about 20 bar.

* * * * *